US007503277B2

(12) United States Patent
Boschma, Jr. et al.

(10) Patent No.: US 7,503,277 B2
(45) Date of Patent: Mar. 17, 2009

(54) AEROSTAT INFLATOR

(75) Inventors: James H. Boschma, Jr., Huntsville, AL (US); William Douglas McDaniel, Huntsville, AL (US); Michael McNabb, Huntsville, AL (US); Michael Ryder, Brownsboro, AL (US); Callum R. Sullivan, New Market, AL (US); Glenn Martin Tierney, Huntsville, AL (US); Peter K. Van Staagen, Madison, AL (US)

(73) Assignee: Information Systems Laboratories, Inc., San Diego, CA (US)

( * ) Notice: Subject to any disclaimer, the term of this patent is extended or adjusted under 35 U.S.C. 154(b) by 203 days.

(21) Appl. No.: 11/539,038

(22) Filed: Oct. 5, 2006

(65) Prior Publication Data

US 2008/0083848 A1 Apr. 10, 2008

(51) Int. Cl.
*B64B 1/40* (2006.01)

(52) U.S. Cl. ........................................ 116/210; 244/31

(58) Field of Classification Search .................. 244/31, 244/33; 116/210, DIG. 6, DIG. 8, DIG. 9; 446/220, 221; 441/9, 30
See application file for complete search history.

(56) References Cited

U.S. PATENT DOCUMENTS 1,370,043 A 3/1921 Preston
3,763,506 A 10/1973 Szego
4,003,098 A 1/1977 Fink
4,104,750 A 8/1978 Kelter et al.
4,402,479 A 9/1983 Phipps, III et al.
4,416,433 A * 11/1983 Bellina ........................ 244/33
4,586,456 A * 5/1986 Forward ..................... 116/210
5,005,513 A * 4/1991 Van Patten et al. .......... 116/210
5,816,537 A 10/1998 Pascoe et al.
6,008,938 A 12/1999 Suehle et al.
6,883,749 B2 4/2005 Boschma, Jr.
7,275,496 B2 * 10/2007 French et al. ............... 116/210

* cited by examiner

*Primary Examiner*—Tien Dinh
(74) *Attorney, Agent, or Firm*—Nydegger & Associates

(57) ABSTRACT

A device for deploying an aerostat includes a cylindrical shaped container having an open end and a closed end and a center tube axially oriented in the container. A tapered disc is mounted for axial movement on the center tube, and it has a taper of increasing diameter in an axial direction from the closed end toward the open end of the container. In its operation, the tapered disc is held in a first position while a portion of the aerostat is loaded into the container. It is then moved to a second position wherein the tapered disc holds the loaded portion of the aerostat in the container. Thereafter, the disc is moved to a release position wherein the disc directs deployment of the aerostat from the container.

11 Claims, 3 Drawing Sheets

FIG. 1
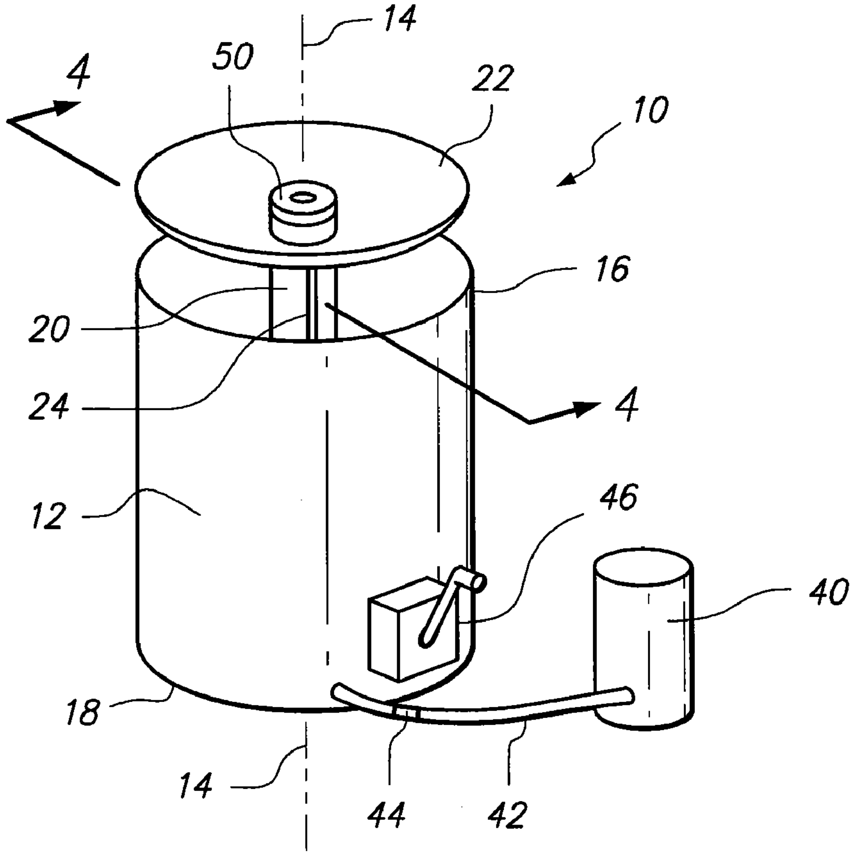
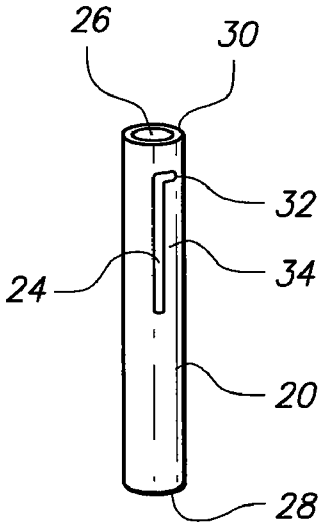
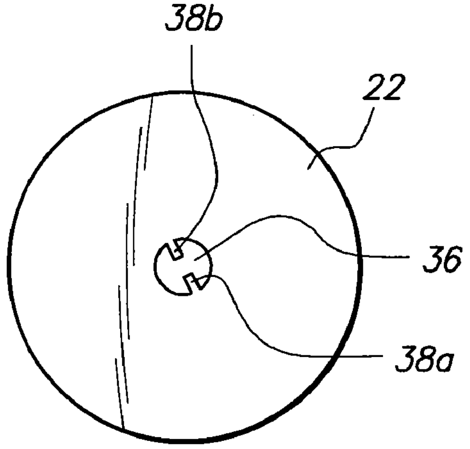
FIG. 2
FIG. 3

AEROSTAT INFLATOR

FIELD OF THE INVENTION

The present invention pertains generally to aerostats. More particularly, the present invention pertains to devices and methods for inflating and deploying aerostats. The present invention is particularly, but not exclusively, useful as a device or a method that provides for the storage of an aerostat in a transportable container prior to the simultaneous inflation and deployment of the aerostat from the container.

BACKGROUND OF THE INVENTION

An aerostat derives its lift from the buoyancy of surrounding air, rather than from aerodynamic motion as in the case of an airplane, or from propulsive forces as in the case of a rocket. Moreover, like a balloon, an aerostat can derive lift only when it is inflated with a lighter-than-air gas, such as helium. More specifically, this requires the aerostat be inflated to a relatively large volume. Due to its increased size during flight operations, it is desirable that the aerostat be deflated when it is not being flown.

For the operational cycle of an inflated/deflated aerostat, the ability of the aerostat to be easily transitioned from one configuration to the other may be of crucial importance to the operator. If done quickly and efficiently, this reconfiguration can require the accomplishment of several specific tasks. For instance, once an aerostat has been deflated, it must then somehow be stored. And, in general, this requires the aerostat be folded and placed in an appropriate container. Preferably, the containerized aerostat can be stabilized and kept reasonably compact during storage. It is also preferable that the container be easily transportable. Further, and perhaps more importantly, it may be an essential capability of the containerized aerostat that it be reliably and conveniently inflated for subsequent deployment.

In light of the above, it is an object of the present invention to provide a device for storing and deploying an aerostat that will inflate the aerostat as it is being deployed from its storage container. Another object of the present invention is to provide a device and a method that allows an aerostat to be properly stored in the container prior to deployment. Yet another object of the present invention is to provide a device and a method for storing an aerostat in a container, and for subsequently deploying the aerostat from the container that is easy to use, is relatively simple to manufacture, and is comparatively cost effective.

SUMMARY OF THE INVENTION

In accordance with the present invention, a device for deploying an aerostat includes a cylindrical shaped container that has an open end and a closed end. A base member covers and defines the closed end (i.e. bottom) of the container, and a center tube is mounted on the base member. Specifically, the center tube is oriented in axial alignment in the container, and one end of the center tube extends beyond the container's open end. The device also includes a tapered disc that is mounted for axial movement on the center tube, and it has a winch that is mounted on the base member and is connected to the tapered disc to control movements of the disc.

The device of the present invention also includes a coaxial fill tube that is positioned inside the center tube, and it has a source of helium gas that is connected in fluid communication with the fill tube. Additionally, the device has a connector that is positioned at the extended end of the center tube for engagement with a nose ring on the aerostat. With this engagement the aerostat can be connected in fluid communication with the fill tube and, hence, the source of helium gas.

Some specific structural aspects of the present invention are particularly important. For one, when mounted on the center tube, the disc has a taper that increases in diameter in an axial direction away from the closed end of the container. For another, the disc is formed with a center hole and it has protrusions that project into the center hole. These protrusions allow for an engagement of the disc with the center tube. For this engagement, the center tube is formed with a plurality of axially aligned slots, and each axial slot is contiguous with an azimuthally oriented locating slot. Thus, as each protrusion from the disc extends into a respective axially aligned slot in the center tube, the disc can be moved axially along the center tube. On the other hand, the disc can also be held stationary on the center tube when the protrusions are inserted into the azimuthally oriented locating slots.

In the operation of the present invention, the tapered disc is initially moved and held stationary in a first axial position (i.e. disc protrusions are inserted into the locating slots). With the disc in this first axial position, a body portion of the aerostat is loaded into the container. Specifically, this loading involves folding the body portion of the aerostat around the stationary disc and into the container. Once the container is thus loaded, the disc is rotated to move its protrusions out of the locating slots and into the axially aligned slots. The disc is then pulled by operation of the winch toward the closed end of the container, and into a second axial position. With the disc in this second axial position, the loaded, body portion of the aerostat is held in the container. It should be noted that after the body portion of the aerostat has been loaded, the tail portion of the aerostat remains external to the container. The tail portion of the aerostat is then folded on top of the disc.

When the aerostat is to be deployed, the tapered disc is moved to a release position and the aerostat is then inflated. During inflation, the tail portion of the aerostat inflates first. Additional inflation causes the body portion of the aerostat to be pulled from the container, around the disc. As this happens, a force is maintained on the disc by the winch that acts against the aerostat to control its release from the container. Thus, the disc directs deployment of the aerostat from the container.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of a device in accordance with the present invention for storing and deploying an aerostat;

FIG. 2 is a perspective view of a center tube used with the device;

FIG. 3 is a top plan view of the tapered disc component of the device;

DESCRIPTION OF THE PREFERRED EMBODIMENTS

Figure 4A:
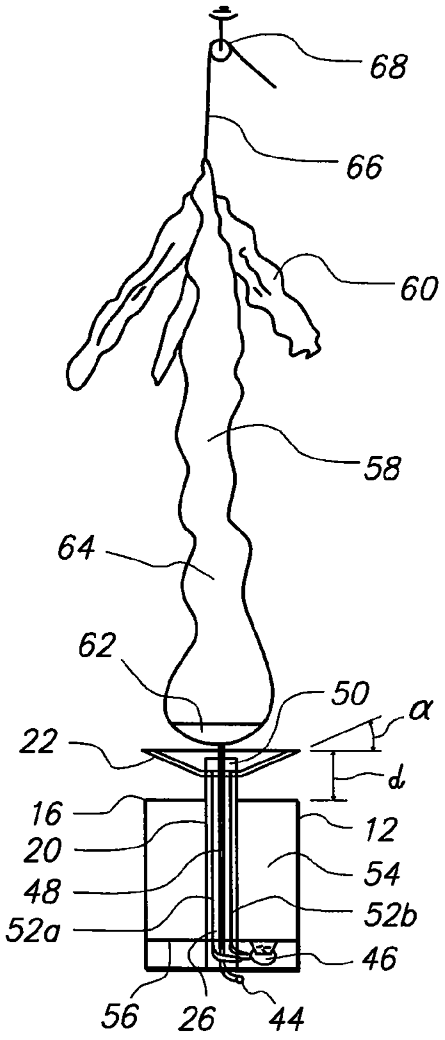
FIG. 4A is an elevation view of an aerostat prepared for loading into the device of the present invention, with the device shown in cross section as seen along the line 4-4 in FIG. 1.

Referring initially to FIG. 1, a device in accordance with the present invention for storing and deploying an aerostat is shown and is generally designated 10. As shown, the device 10 includes a cylindrically shaped container 12 that defines a longitudinal axis 14. Further, the container 12 has an open end 16 and a closed end 18. Also, the device 10 includes a center tube 20 that is positioned inside the container 12 and oriented along the axis 14. Mounted on the center tube 20, substantially as shown, is a tapered disc 22.

FIG. 2 shows that the center tube 20 is formed with an axially aligned slot 24, and that it has a lumen 26 that extends the length of the center tube 20 from end 28 to end 30. Further, the center tube 20 is formed with a locating slot 32 that is contiguous with the axially aligned slot 24, and is azimuthally oriented on the center tube 20. Both the axially aligned slot 24 and the locating slot 32 extend from the surface 34 of the center tube 20, and through the center tube 20 to the lumen 26. In a preferred embodiment of the device 10, both the axially aligned slot 24 and the locating slot 32 have respectively corresponding slots (not shown) that are diametrically opposed to the slots 24 and 32.

FIG. 3 shows that the tapered disc 22 is formed with a center hole 36. FIG. 3 also shows that the disc 22 has a pair of diametrically opposed protrusions 38*a* and 38*b* that extend into the center hole 36. With this structure, when the tapered disc 22 is engaged with the center tube 20, the protrusion 38*a* is inserted for positioning in either the axially aligned slot 24 or in the locating slot 32 that is contiguous therewith. Similarly, the protrusion 38*b* is inserted into the corresponding diametrically opposed slots (not shown).

Referring back to FIG. 1, it is seen that the device 10 includes a gas source 40 that contains a lighter-than-air gas, such as helium. FIG. 1 also shows that the gas source 40 includes a hose 42 that connects it with an adapter 44. Further, FIG. 1 shows that the device 10 also includes a winch 46. The cooperation of the gas source 40 and the winch 46 with other components of the device 10 will be best appreciated with reference to FIG. 4A.

In FIG. 4A, it will be seen that the device 10 includes a fill tube 48 that is coaxially positioned in the lumen 26 of the center tube 20. As shown, the fill tube 48 can be connected in fluid communication with the gas source 40, via the adapter 44. FIG. 4A also shows that a pair of tension wires 52*a* and 52*b* extend through the lumen 26 of center tube 20 to interconnect the tapered disc 22 with the winch 46. Further, it will be seen in FIG. 4A that the container 12 defines a chamber 54 that is partially bounded by a base member (bottom) 56 on which the center tube 20 is mounted. It is also indicated in FIG. 4A that the tapered disc 22 can be generally characterized as having a taper angle "α" that will be in a range from zero to about twenty degrees ($\alpha=0°$ to $20°$).

Still referring to FIG. 4A, an aerostat 58 for use with the device 10 is shown to include a tail section 60 and a nose ring 62, with a body portion 64 therebetween. As intended for the present invention, the nose ring 62 of aerostat 58 can be engaged with the connector 50 on center tube 20. This engagement accomplishes at least two functions. For one, it fixedly holds the aerostat 58 on the device 10. For another, it connects the aerostat 58 in fluid communication with the gas source 40. As specifically intended for the present invention, with this engagement, the aerostat 58 can be deflated and stored in the chamber 54 of the container 12 (see FIGS. 4A-4B). Also, while so engaged, a deflated aerostat 58 can be inflated for deployment (see FIGS. 5A-5C).

OPERATION

For an operation of the device 10 of the present invention, various stages of a deflation and storage procedure for the aerostat 58 are sequentially shown in FIGS. 4A through 4D. Referring first to FIG. 4A, it is seen that the aerostat 58 is hung from its tail section 60 by a line 66 and pulley 68. In this condition, the nose ring 62 of the aerostat 58 is attached to the connector 50 of the device 10. Importantly, in this configuration, the tapered disc 22 is in a first axial position wherein the disc 22 is at a distance "d" from the open end 16 of the container 12 (see FIG. 4A). It is also important to note that in this position (FIG. 4A) the protrusions 38*a* and 38*b* are respectively seated in locating slots 32 on the center tube 20. Thus, the tapered disc 22 is held stationary, relative to the center tube 20. With the device 10 in this configuration, the aerostat 58 is then lowered by the line 66 and pulley 68.

Figure 4B:
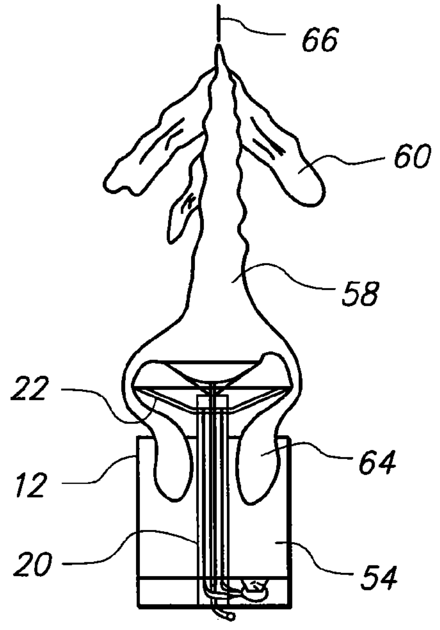
FIG. 4B is a view of the device and aerostat, as seen in FIG. 4A, with the aerostat in its initial phase of loading.
Figure 4C:
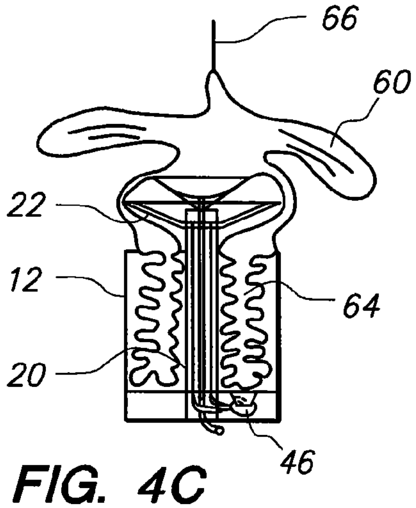
FIG. 4C is a view of the device and aerostat, as seen in FIG. 4B, with the aerostat in its final phase of loading.

As the aerostat 58 is being lowered by the line 66, and while the tapered disc 22 is held stationary in its first axial position, the body portion 64 of the aerostat 58 is folded and fed into the chamber 54 of container 12 (see FIG. 4B). This continues until substantially all of body portion 64 of the aerostat 58 has been stored in the chamber 54 (see FIG. 4C). At this point, the tapered disc 22 is rotated to move the protrusions 38*a* and 38*b* from the locating slots 32 and into respective axially aligned slots 24. The winch 46 is then activated to pull the tapered disc 22 by the tension wires 52*a* and 52*b* until the disc 22 is moved to a second axial position. In the second axial position, the distance "d" is substantially zero (see FIG. 4D). Tail portion 60 of the aerostat 58 can then be folded into the space between the tapered disc 22 and the nose ring 62. In this configuration (shown in FIG. 4D) the device 10 with aerostat 58 can be moved and stored as desired.

Figure 4D:
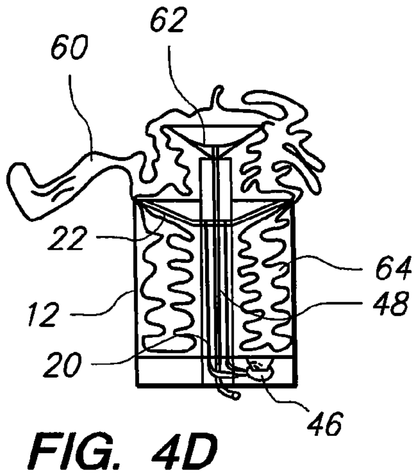
FIG. 4D is a view of the device and aerostat, as seen in FIG. 4C, with the aerostat essentially loaded in the device.
Figure 5A:
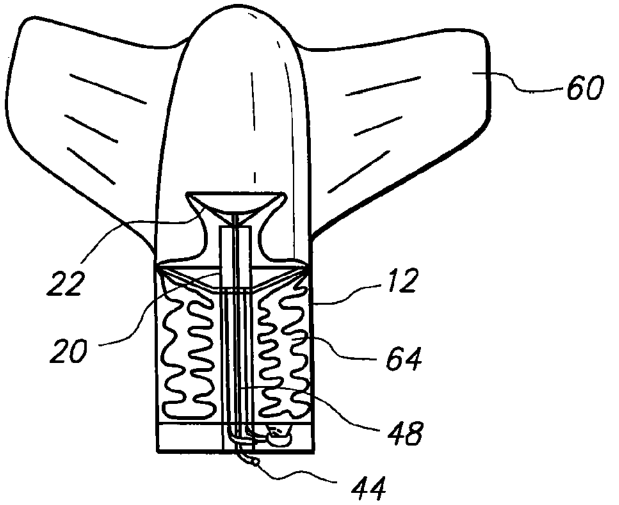
FIG. 5A is a view of the device and aerostat, as seen in FIG. 4D with the aerostat in its initial phase of deployment (tail section inflated)
Figure 5B:
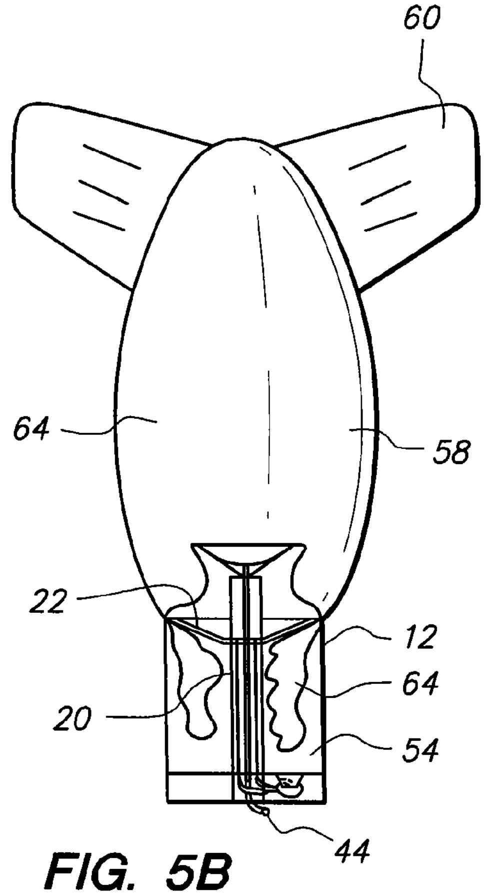
FIG. 5B is a view of the device and aerostat, as seen in FIG. 5A, with the aerostat partially deployed.
Figure 5C:
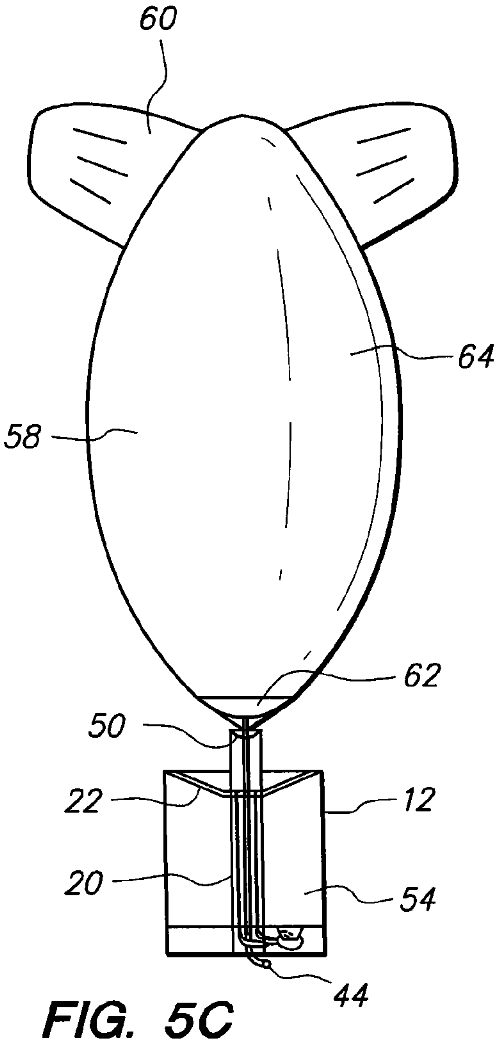
FIG. 5C is a view of the device and aerostat, as seen in FIG. 5B, with the aerostat deployed.

The stages of an inflation procedure for the aerostat 58 begins with the configuration shown in FIG. 4D. Subsequent stages are then sequentially shown in FIGS. 5A through 5C. When referring to FIGS. 4D and 5A through 5C, recall that the gas source 40 can be attached to the adapter 44, to thereby establish fluid communication between the gas source 40 and the aerostat 58 (see also FIG. 1). Thus, once the gas source 40 is connected as described, the tapered disc 22 is moved from its second axial position (see FIG. 4D) to a release position (see FIG. 5A). As a practical matter, this movement of the tapered disc into its release position may be very minimal, or even non-existent (i.e. the release position may be essentially the same as the second axial position). In any event, as indicated in FIG. 5A, an inflation of the entire aerostat 58 is started with an inflation of only the tail section 60 of the aerostat 58. This is done while the body portion 64 of the aerostat 58 is still in the chamber 54 of container 12. Specifically, a lighter-than-air gas (preferably helium) is fed from the gas source 40, and through the fill tube 48, into the aerostat 58 for this purpose. As inflation of the aerostat 58 continues (see FIG. 5B), the body portion 64 is drawn from the container 12. Importantly, in order to control the deployment of the body portion 64 from the chamber 54 of container 12, a tension force can be maintained on the body portion 64 by the tapered disc 22. Specifically, this can be done by a manipulation of the winch 46. Eventually, once the entire aerostat 58 has been inflated (see FIG. 5C), the nose ring 62 of the aerostat 58 can be disengaged from the connector 50 of device 10. The aerostat 58 is thus fully deployed.

While the particular Aerostat Inflator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for deploying an aerostat which comprises:

a cylindrical shaped container having an open end and a closed end, and defining an axis;

a tapered disc mounted on the container for movements along the axis thereof, the disc having a taper of increasing diameter in an axial direction from the closed end toward the open end of the container; and a means for moving the tapered disc between a first axial position wherein the tapered disc is held stationary while a portion of the aerostat is loaded into the container, a second axial position wherein the tapered disc holds the loaded portion of the aerostat in the container, and a release position wherein the disc directs deployment of the aerostat from the container.

2. A device as recited in claim 1 wherein the moving means comprises:

a base member covering and defining the closed end of the container;

a center tube having a first end and a second end with the second end thereof mounted on the base member to orient the center tube in axial alignment with the container, and with the first end thereof extending beyond the open end of the container, wherein the tapered disc is mounted on the center tube for axial movement thereon; and a winch mounted on the base member for moving the tapered disc between the first axial position wherein the tapered disc is distanced from the open end of the container, the second axial position wherein the disc is drawn toward the base member to hold the loaded portion of the aerostat in the container, and a release position wherein the disc maintains a force on the aerostat to direct deployment of the aerostat from the container.

3. A device as recited in claim 2 wherein the center tube is formed with a plurality of slots, and the disc includes a plurality of protrusions extending therefrom and into respective slots of the center tube for engagement therewith to hold the disc in its first axial position.

4. A device as recited in claim 2 further comprising:

a source of helium gas connected to the base member; and a fill tube positioned inside the center tube and oriented in coaxial alignment therewith, the fill tube having a first end adjacent the first end of the center tube, and having a second end connected in fluid communication with the source of helium gas.

5. A device as recited in claim 4 wherein the aerostat includes a nose ring, and wherein the device further comprises:

a connector positioned at the first end of the center tube for attaching the center tube to the nose ring of the aerostat; and a means mounted on the connector for coupling the aerostat in fluid communication with the fill tube.

6. A device as recited in claim 1 wherein the release position is the second axial position.

7. A device as recited in claim 1 wherein the release position is between the first and second axial positions.

8. A device for deploying an aerostat which comprises:

a hollow, substantially cylindrical shaped container having an open end and a closed end, and defining a central axis extending therebetween;

a base member covering and defining the closed end of the container;

a center tube having a first end and a second end with the second end thereof mounted on the base member for axial alignment in the container, with the first end thereof extending beyond the open end of the container;

a connector positioned at the first end of the center tube for attaching the center tube to the aerostat;

a tapered disc mounted on the center tube for axial movement thereon, the disc having a substantially uniform taper with an increasing diameter in an axial direction from the closed end and toward the open end of the container; and a winch mounted on the base member for moving the tapered disc between a first axial position wherein the disc is distanced from the open end of the container and held stationary while the aerostat is loaded into the container, a second axial position wherein the tapered disc is drawn toward the base member to hold the loaded portion of the aerostat in the container therebetween, and a release position to direct deployment of the aerostat from the container.

9. A device as recited in claim 8 wherein the center tube is formed with a plurality of slots, and the disc includes a plurality of protrusions extending therefrom into respective slots of the center tube for engagement therewith to hold the disc in its first axial position.

10. A device as recited in claim 8 further comprising:

a source of helium gas connected to the base member; and a fill tube positioned inside the center tube in coaxial alignment therewith, the fill tube having a first end adjacent the first end of the center tube, and having a second end connected in fluid communication with the source of helium gas.

11. A device as recited in claim 10 wherein the aerostat includes a nose ring, and wherein the device further comprises:

a connector positioned at the first end of the center tube for attaching the center tube to the nose ring of the aerostat; and a means mounted on the connector for coupling the aerostat in fluid communication with the fill tube.

* * * * *